US009096001B2

(12) United States Patent
Wojtaszek et al.

(10) Patent No.: US 9,096,001 B2
(45) Date of Patent: Aug. 4, 2015

(54) CLINCHING DURING MOLDING PROCESS (75) Inventors: Henry J. Wojtaszek, Holly, MI (US); Joel McPhee, Toronto (CA); Paul Smith, Bradford (CA)

(73) Assignee: Magna International Inc., Aurora (CA)

( * ) Notice: Subject to any disclaimer, the term of this patent is extended or adjusted under 35 U.S.C. 154(b) by 1016 days.

(21) Appl. No.: 12/856,068

(22) Filed: Aug. 13, 2010

(65) Prior Publication Data
US 2011/0039123 A1 Feb. 17, 2011

Related U.S. Application Data

(60) Provisional application No. 61/274,274, filed on Aug. 14, 2009.

(51) Int. Cl.
*B29C 45/14* (2006.01)
*B29K 705/00* (2006.01)

(52) U.S. Cl.
CPC ....... *B29C 45/1418* (2013.01); *B29C 45/14778* (2013.01); *B29K 2705/00* (2013.01); *Y10T 428/12569* (2015.01)

(58) Field of Classification Search
CPC ...................... B29C 45/14778; B29C 45/1418
See application file for complete search history.

(56) References Cited

U.S. PATENT DOCUMENTS

| 4,306,511 | A | * | 12/1981 | Ashby et al. ..................... 29/521 |
| 4,956,139 | A | * | 9/1990 | Koizumi et al. ............... 264/156 |
| 5,673,472 | A | * | 10/1997 | Muller ......................... 29/432.1 |
| 5,842,265 | A | * | 12/1998 | Rink ............................... 29/460 |
| 2004/0232591 | A1 | * | 11/2004 | Dajek et al. .................. 264/259 |

\* cited by examiner

*Primary Examiner* — Edmund Lee
(74) *Attorney, Agent, or Firm* — Warn Partners, P.C.

(57) ABSTRACT

The integration of two separate manufacturing processes involving joining two pieces of metal using a clinching or Tog-L-Loc™ type of connection, while also injecting a molten material around the two pieces of metal to create the desired part. A process for creating the desired part made of both plastic and metal includes the steps of providing a first metal component, a second metal component, inserting the first metal component into a mold, and inserting the second metal component into the mold. At least one connection point is used for connecting the first metal component to the second metal component while the metal components are located in the mold. Molten material, such as a thermoplastic, is injected into the mold around the first metal component and the second metal component, forming the desired part using the first metal component, the second metal component, and the hardened molten material.

26 Claims, 14 Drawing Sheets

CLINCHING DURING MOLDING PROCESS

This application claims the benefits of U.S. Provisional Application No. 61/274,274, filed Aug. 14, 2009.

FIELD OF THE INVENTION

The present invention relates to the reduction of steps in the manufacturing process of a part made from injection molded plastic and more than one metal component.

BACKGROUND OF THE INVENTION

Injection molding is a commonly used process in which molten material is injected into a cavity, or mold, to form a desired part of a specific shape. Injection molding is used to create many different types of parts used in automotive, computer, household, or other applications.

One type of injection molding process also includes the forming of a part made of both metal and a type of plastic, where the plastic is in a molten form and injected into a mold containing the portion of the part made of metal. The plastic forms in an overmold around the metal material into the desired shape. The finished part is therefore made of both plastic and metal.

Additionally, parts made of more than one piece of metal, such as sheet metal, are often connected together through the use of what is referred to as "clinching." Sheet metal clinching involves the connection of two pieces of metal without additional components, and an interlock is formed between the two sheets. This type of connection is also referred to as a "Tog-L-Loc™" process, which is a trademark for a process used by BTM Corporation of Marysville, Mich.

When parts made of plastic and multiple pieces of metal are created using both clinching and injection molding, there are two different stages of the manufacturing process used. One stage is the connection, or clinching, of the metal pieces. Another stage includes the placement of the connected metal pieces into a mold, and injecting a molten material around the metal pieces such that the desired portion of the finished part which is made of plastic is formed properly around the two pieces of metal.

However, using these two stages to form the desired part is costly. Accordingly, there exists a need for an improved method of manufacturing a part made of plastic and metal, which reduces the steps required in the manufacturing process.

SUMMARY OF THE INVENTION

The present invention is directed to the integration of two separate manufacturing processes involving joining two pieces of metal using a clinching or Tog-L-Loc™ type of connection, while also injecting a molten material around the two pieces of metal to create the desired part.

The present invention is directed to a process for creating a component made of both plastic and metal which includes the steps of providing a first metal component, a second metal component, inserting the first metal component into a mold, and inserting the second metal component into the mold. At least one connection point is used for connecting the first metal component to the second metal component while the metal components are located in the mold. Molten material, such as a thermoplastic, is injected into the mold around the first metal component and the second metal component, forming the desired part using the first metal component, the second metal component, and the hardened molten material.

The process according to the present invention also includes providing a punch portion having a small diameter portion and a large diameter portion. The punch portion is mounted within and attached to a first half of the mold, and a die portion is mounted within and attached to a second half of the mold. The punch portion is positioned in the first half of the mold such that the small diameter portion of the punch portion is properly aligned with the areas of the first metal component and the second metal component that are to be used to form the connection point. As each half of the mold is brought together, a force is applied to the large diameter portion such that an area of the first metal component and an area of the second metal component are displaced into the die to form the at least one connection point.

In one embodiment, the small diameter portion of the punch portion is placed in contact with the first metal component to displace a first area of material of the first metal component as the first half of the mold and the second half of the mold are brought together. A second area of material of the second metal component is also displaced as the small diameter portion of the punch portion displaces the first area of material. This forms an interlock using the first area of material with the second area of material, forming the clinch.

In one embodiment, the process according to the present invention is used to create a carrier for a vehicle, but it is within the scope of the invention that the process according to the present invention may be used to create other components as well. In another embodiment, the first metal component is a first piece of sheet metal, and the second metal component is a second piece of sheet metal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An embodiment of a part made in accordance with the present invention is shown in the Figures generally at 10. In this embodiment, the part 10 is a carrier for the front end of a vehicle (not shown), suitable for supporting various components, such as a radiator, headlamps, a horn, and the like. However, it is within the scope of the invention that that other parts may be made in accordance with the present invention. The carrier 10 includes two components made of metal, a first metal component or a front sheet 12 and a second metal component or a rear sheet 14. However, it is within the scope of the invention that other amounts of sheets may be used. The sheets 12,14 are pre-formed to a desired shape. Also included is a composite panel 16, which is made of an injection molded material, such as plastic.

During the assembly of the sheets 12,14 and the panel 16, the front sheet 12 is placed into a mold, shown generally at 34, or cavity, in the desired position relative to the rear sheet 14, which is also placed in the mold. This is also shown in steps 56 and 58 in FIG. 14. The mold 34 is shaped in the form of the desired finished part, in this case the carrier 10. The mold 34 also includes a die portion 30, and a punch portion 20 having a large diameter portion 22 and a small diameter portion 24. The mold 34 has two halves, a first half or cavity half, generally shown at 36, and a second half or core half, shown generally at 38. These steps are also shown at 60,62,64,66 in FIG. 14. In this embodiment, the punch portion 20 is mounted within the first half 36 of the mold 34, shown at step 68, and the die portion 30 is mounted within the second half 38 of the mold 34, shown at step 70. The punch portion 20 receives pressure from a spring 48 and a pin 50, and the pin 50 is mounted within the first half 36 of the mold 34. The die portion 30 is supported by a pin 52 mounted in the second half 38 of the mold 34. The sheets 12,14 are placed in the mold 34 in the desired location relative to one another such that when the process is complete, they are properly connected.

Figure 14:
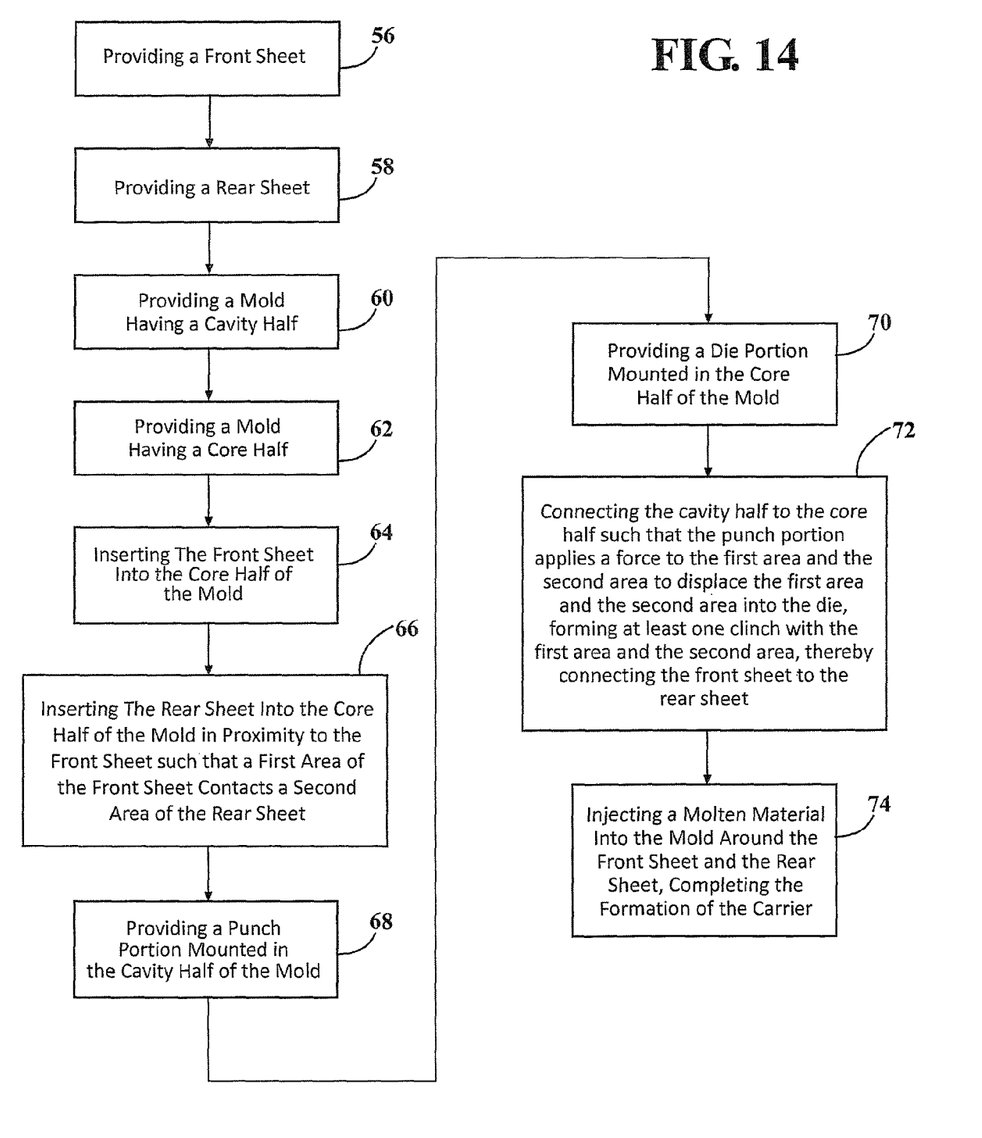
FIG. 14 is a flow diagram showing a process for creating a component made of both plastic and metal, according to the present invention.

After the sheets 12,14 are correctly placed in the mold 34, the mold halves 36,38 are brought together. Although it is shown that the first half 36 is movable and the second half 38 is stationary, it is within the scope of the invention that in other embodiments the first half 36 is stationary and the second half 38 is movable, or both the first half 36 and the second half 38 are movable. There are alignment pins 46 which are used for providing proper alignment between each half 36,38 of the mold 34 and the sheets 12,14 as the halves 36,38 are brought together. As each half 36,38 of the mold 34 is brought together, the small diameter portion 24 contacts the front sheet 12, and force is applied to the large diameter portion 22 by the first half 36 of the mold 34, therefore causing an increased amount of pressure to be transferred from the small diameter portion 24 to the front sheet 12. The area of the front sheet 12 in contact with the small diameter portion 24 is pressed, or "punched," along with a portion of the rear sheet 14 into the die portion 30 (as the halves 36,38 of the mold 34 are brought together) to clinch the front sheet 12 to the rear sheet 14 to form a connection point or a clinch 18, which is shown in FIG. 14 at step 72.

Referring again to the Figures generally, a clinch 18 formed to connect the two sheets 12,14 is shown. After the punch is completed, it can be seen that an area of material or first area, shown generally at 26, of the front sheet 12 has been displaced or deformed, and is interlocked with a corresponding area of material or second area, shown generally at 28, of the rear sheet 14, which has also been displaced, or deformed. The interlock, shown generally at 32, is formed by the area of material 26 of the front sheet 12 and the area of material 28 of the rear sheet 14 deformed together to create the clinch 18, and securely connects the front sheet 12 to the rear sheet 14. Essentially, as the halves 36,38 of the mold 34 are brought together, the area of material 26 of the front sheet 12 and the area of material 28 of the rear sheet 14 is displaced or punched into a recess 40 formed as part of the die 30, which is also shown at step 74 in FIG. 14. The shape of the small diameter portion 24 and the recess 38 define the shape of the clinch 18.

In this embodiment, there are two clinches 18 shown; however, it is within the scope of the invention that more or less clinches 18 may be used. Once clinches 18 are formed, the punch portion 20 remains in contact with the area of material 26 of the front sheet 12 that has been displaced, and both the area of material 26 of the front sheet 12 and the area of material 28 of the rear sheet 14 remain within the die portion 30 as molten material is injected into the mold 34 in the areas around the joined sheets 12,14 as dictated by the shape of the mold 34, thereby forming the composite panel 16, completing the formation of the carrier 10. This is best seen in FIG. 13C, where the punch portion 20 is in contact with the front sheet 12 and the die portion 30 is in contact with the rear sheet 14. Essentially, the molten material is injected into the mold 34 prior to the punch portion 20 being pulled away from the die portion 30. With the punch portion 20 mounted to the first half 36 and the die portion mounted to the second half 38, this eliminates the need for any type of device in the mold 34 to separate the die portion 30 and punch portion 20 from each other.

Figure 1:
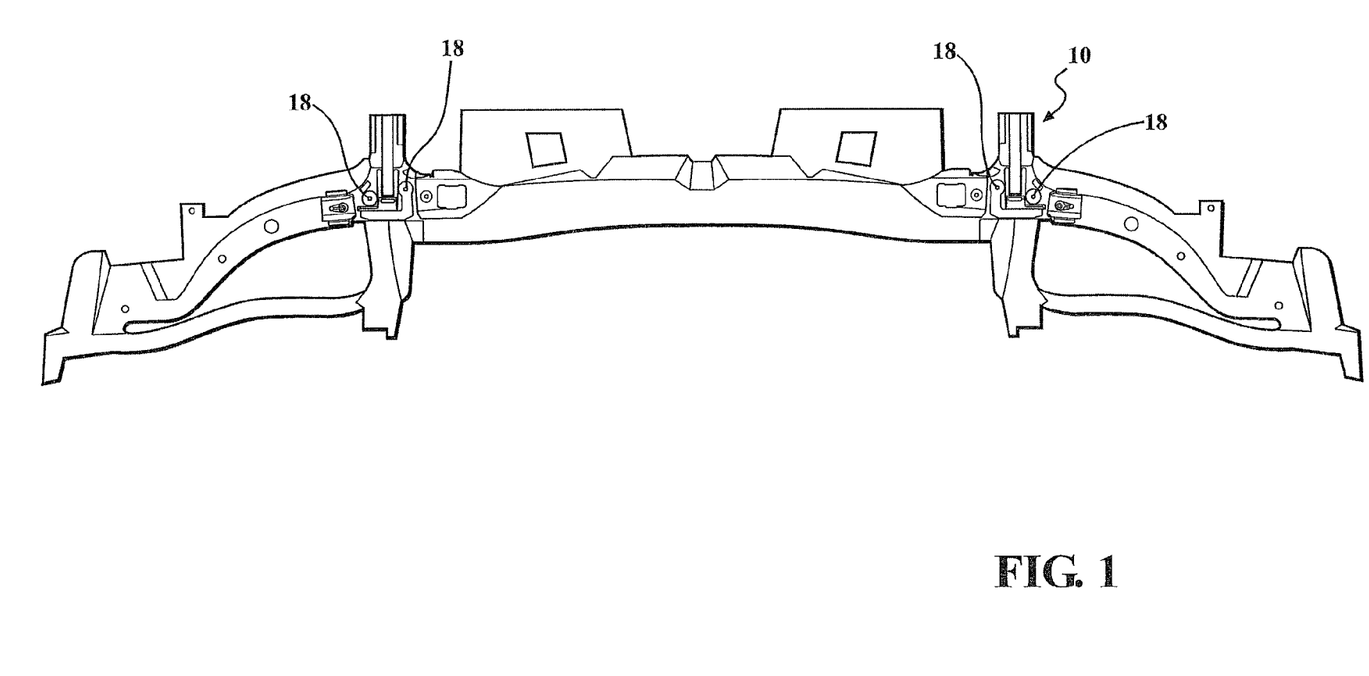
FIG. 1 is a first enlarged perspective view of a carrier for an automobile, assembled using a process according to the present invention.
Figure 2:
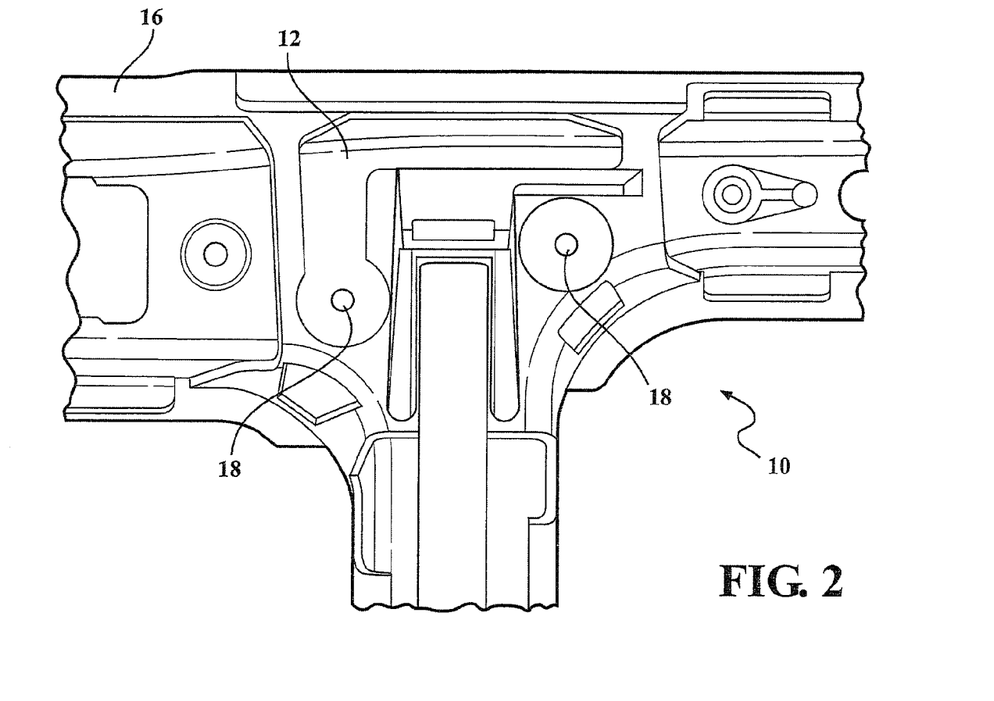
FIG. 2 is an enlarged front view of a carrier for an automobile, assembled using a process according to the present invention.
Figure 3:
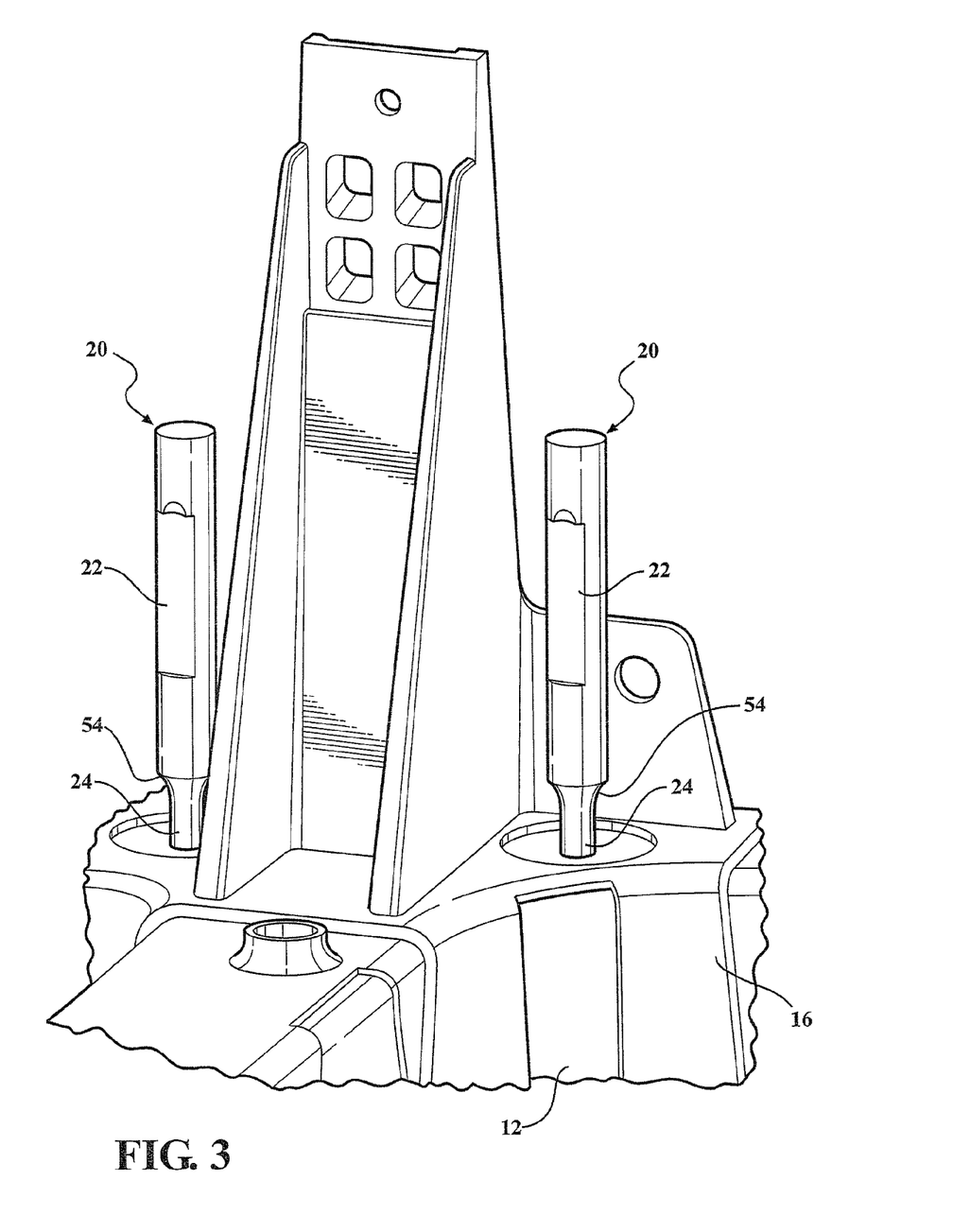
FIG. 3 is a first enlarged perspective front view of a carrier for an automobile, assembled using a process according to the present invention.
Figure 4:
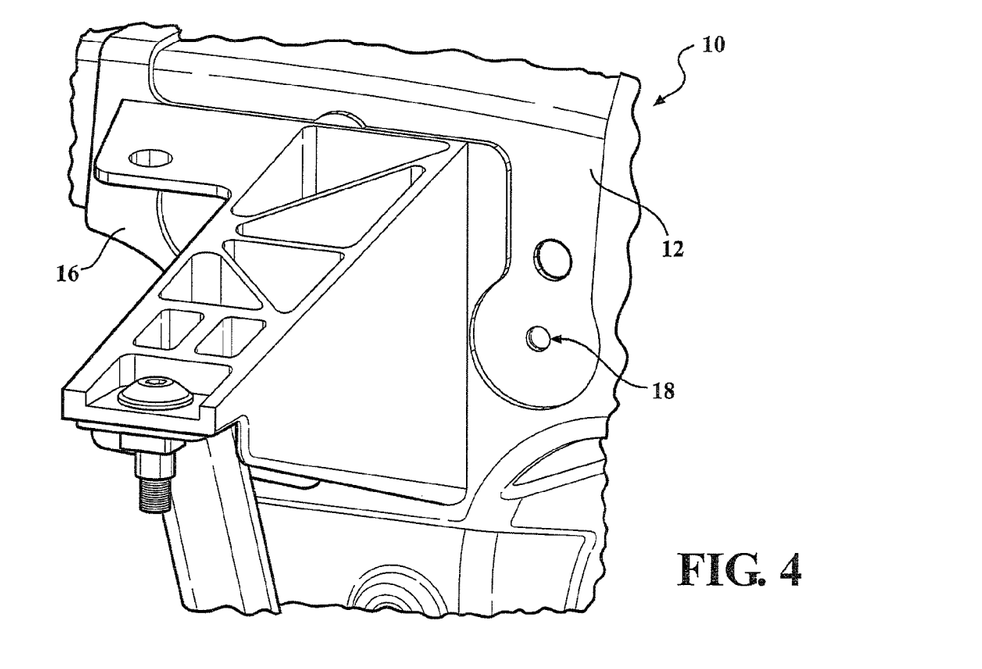
FIG. 4 is a second enlarged perspective front view of a carrier for an automobile, assembled using a process according to the present invention.
Figure 5:
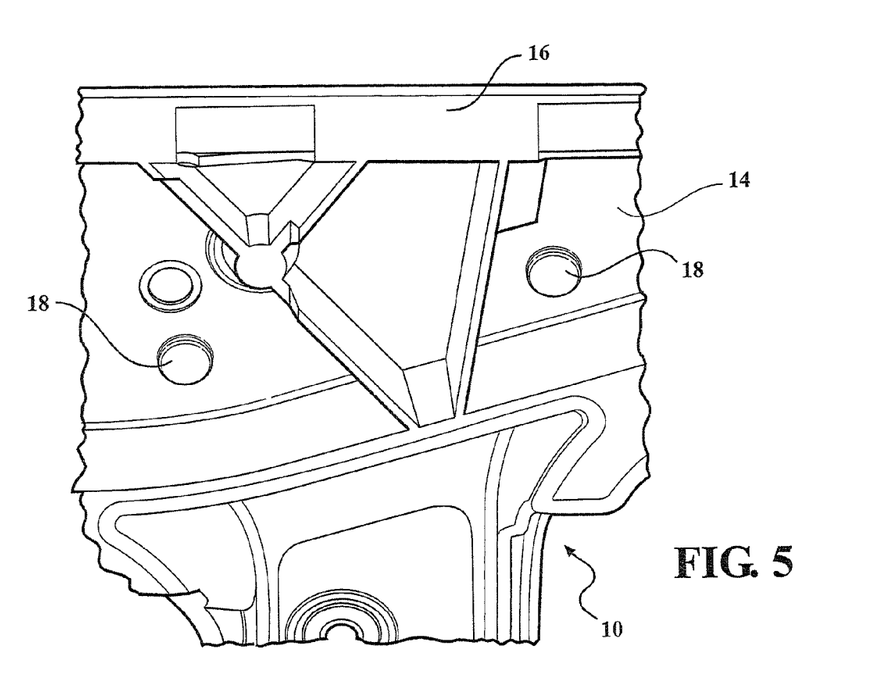
FIG. 5 is a first enlarged perspective rear view of a carrier for an automobile, assembled using a process according to the present invention.
Figure 6:
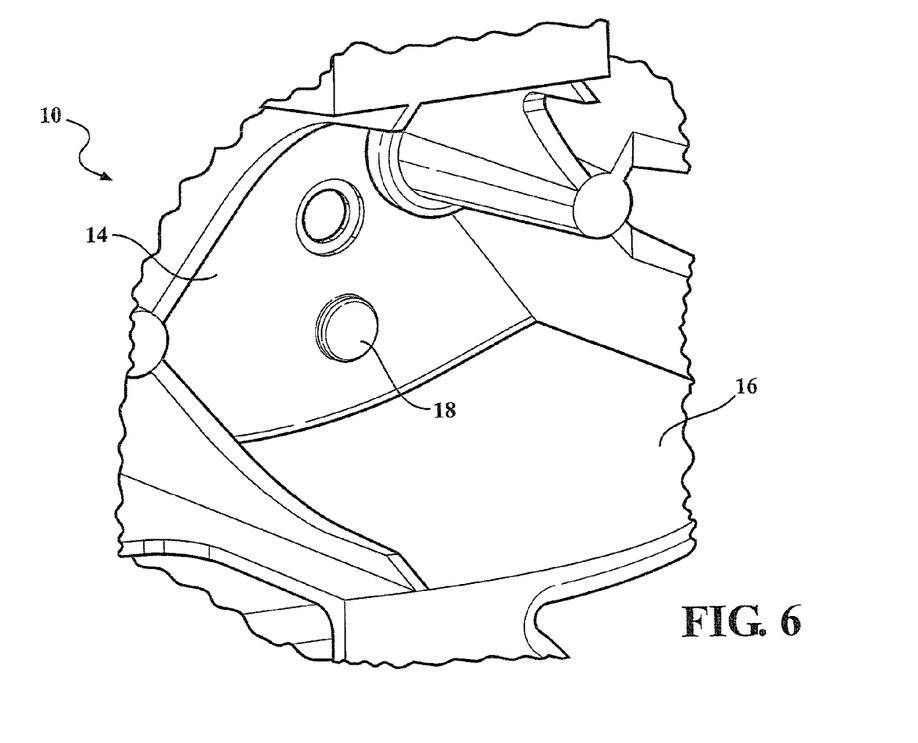
FIG. 6 is a second enlarged perspective view of a carrier for an automobile assembled using a process according to the present invention.
Figure 7:
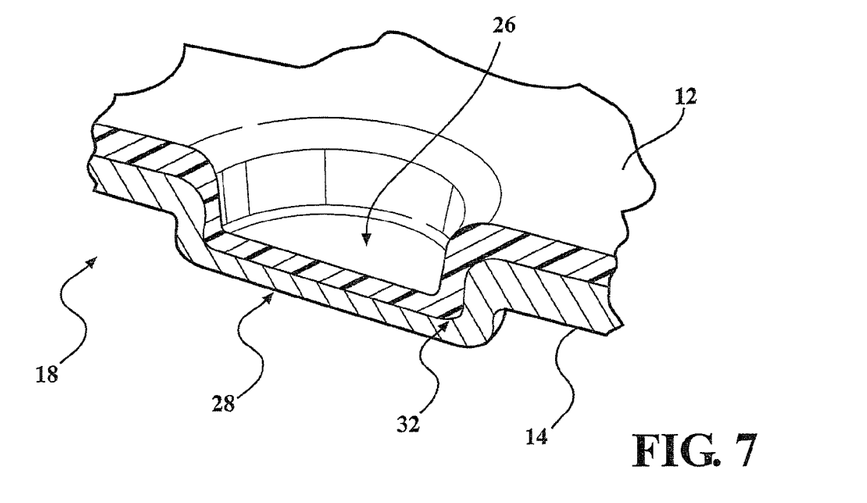
FIG. 7 is a perspective view of a clinch used for connecting two metal components used in the assembly of a carrier for an automobile, assembled using a process according to the present invention.
Figure 8:
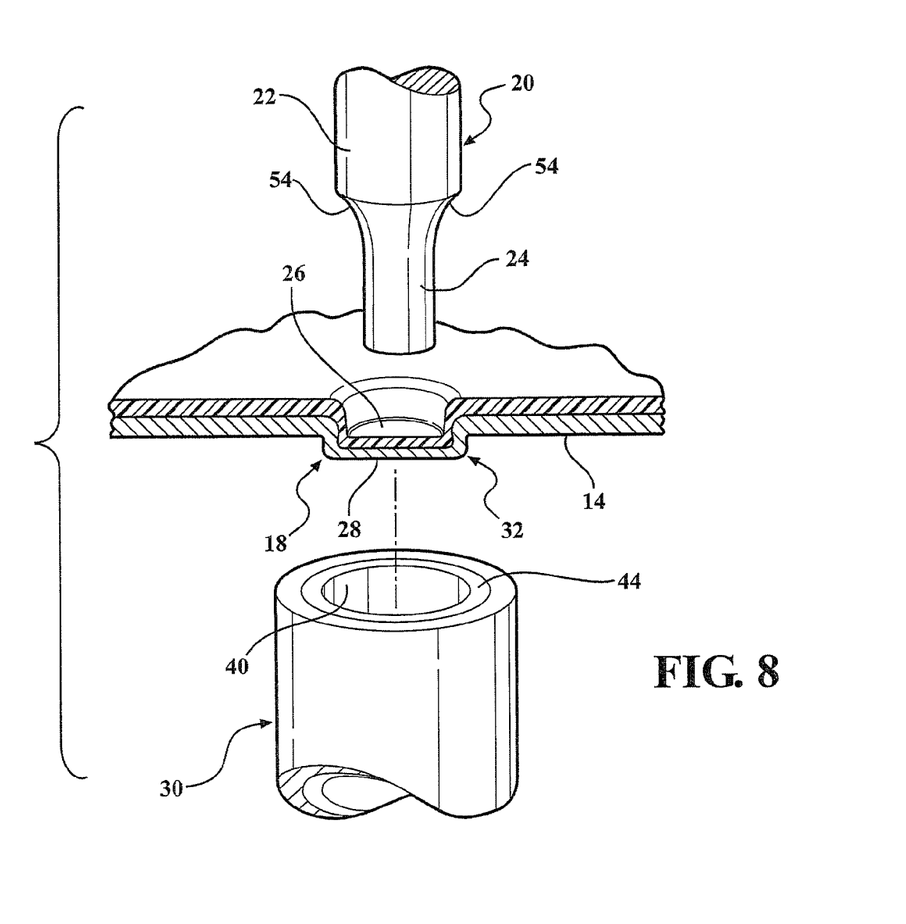
FIG. 8 is a sectional side view of a clinch used for connecting two metal components used in the assembly of a carrier for an automobile, assembled using a process according to the present invention.
Figure 9A:
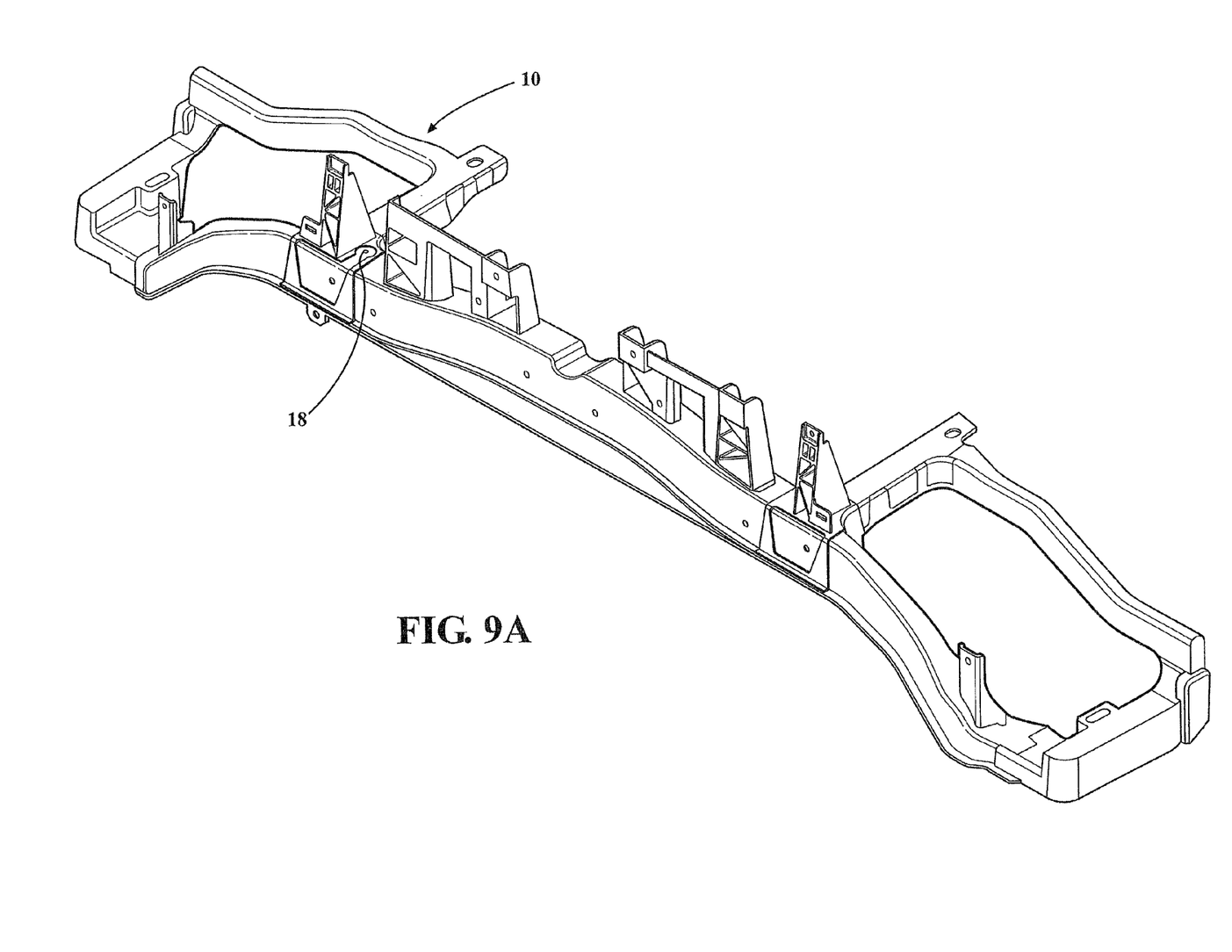
FIG. 9A is a second enlarged perspective view of a carrier a carrier for an automobile, assembled using a process according to the present invention.
Figure 9B:
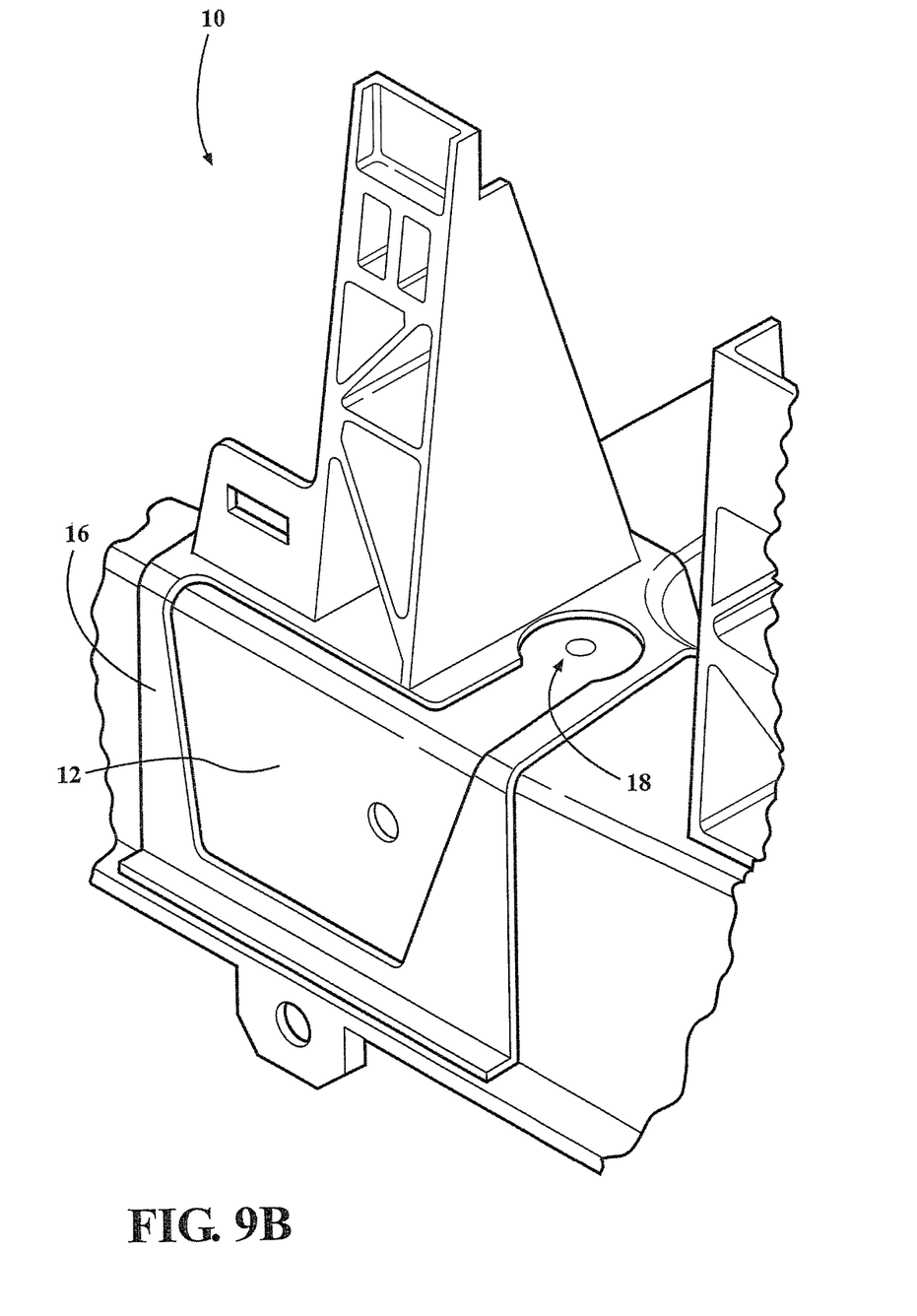
FIG. 9B is an enlarged view of the circled portion of FIG. 9A.
Figure 10:
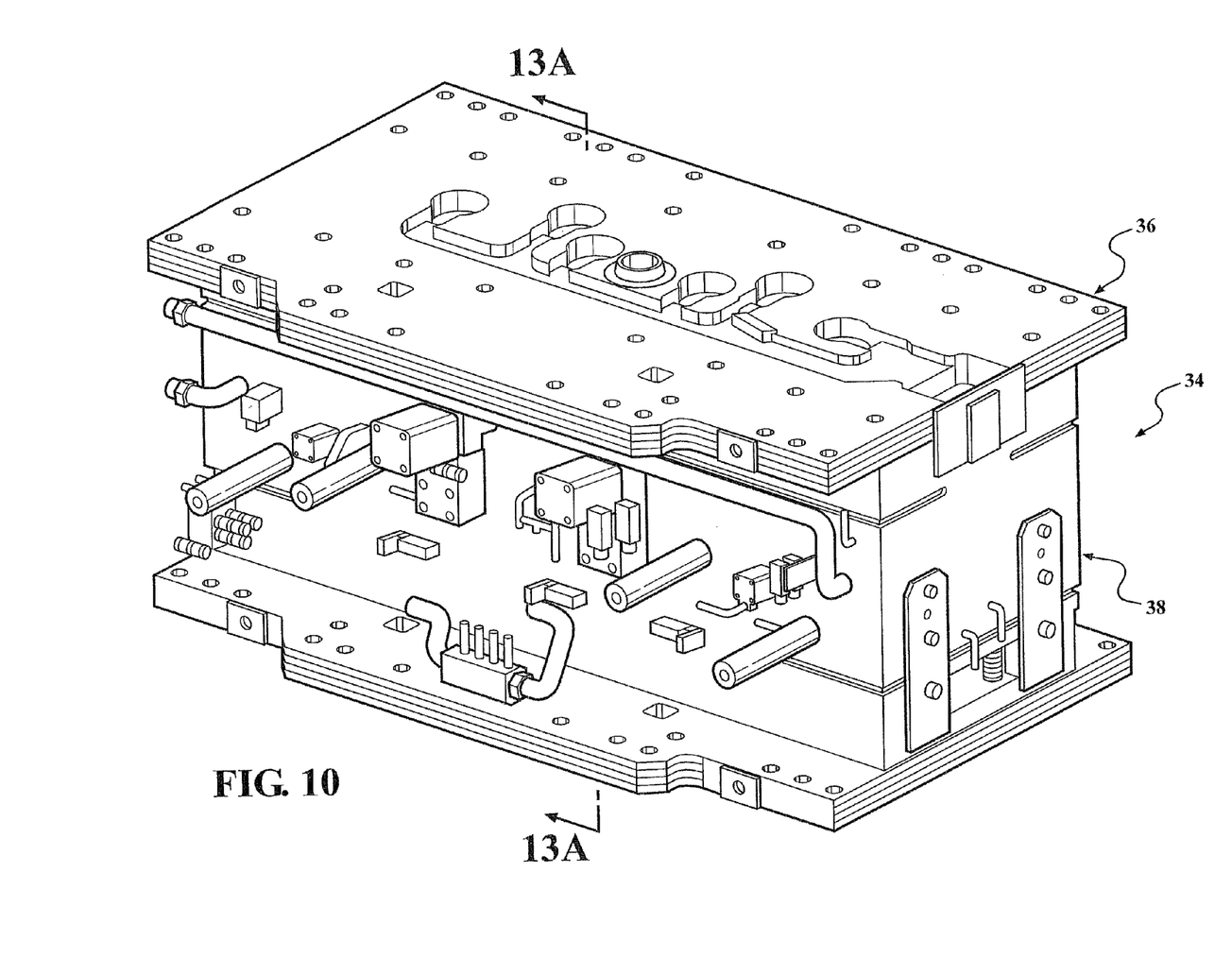
FIG. 10 is a perspective view of a mold used for assembling a carrier, according to the present invention.
Figure 11:
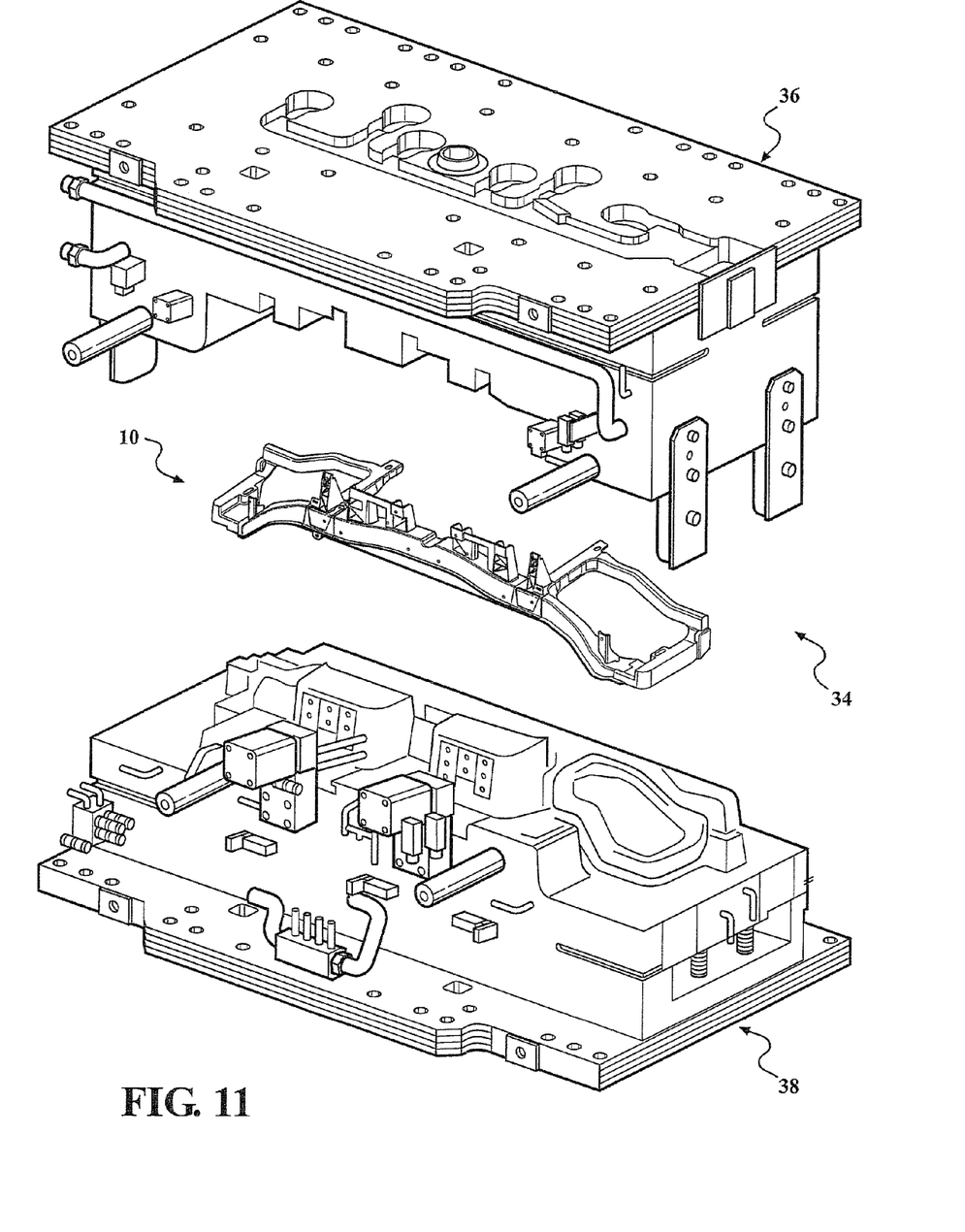
FIG. 11 is an exploded view of a mold used for assembling a carrier, according to the present invention.
Figure 12:
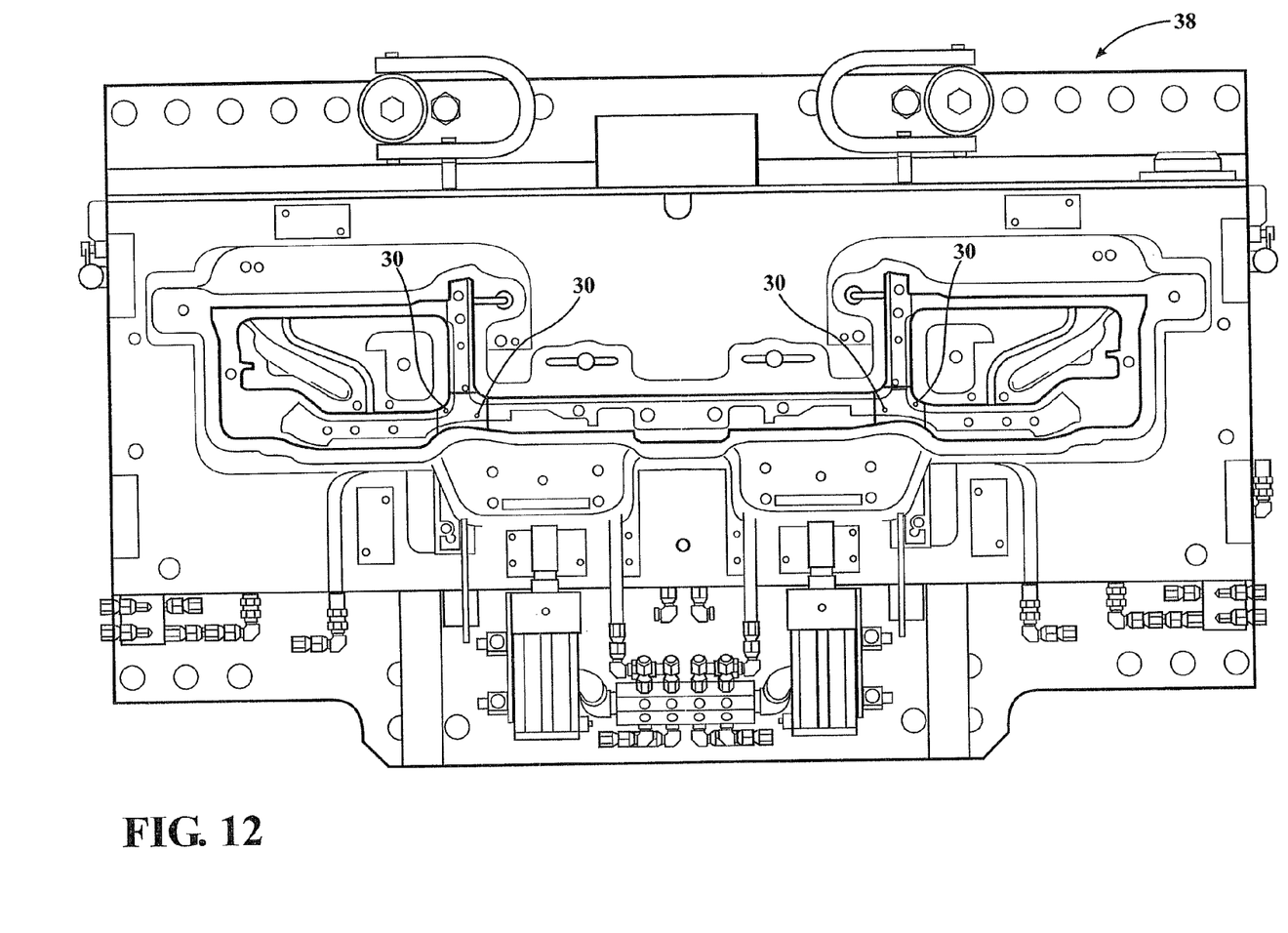
FIG. 12 is a top view of a core half of a mold used for assembling a carrier, according to the present invention.
Figure 13A:
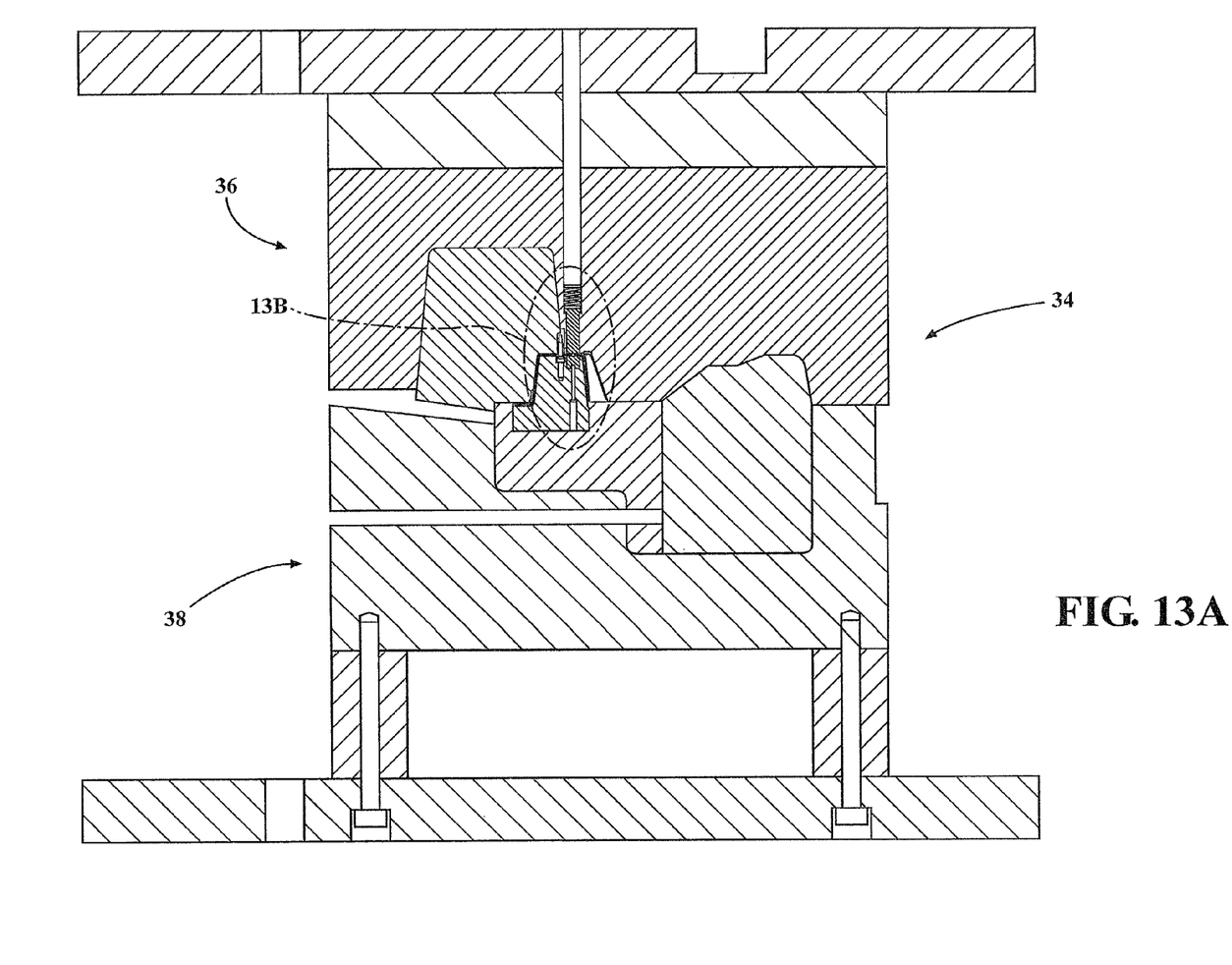
FIG. 13A is a schematic of a sectional view taken along lines 13A-13A of FIG. 10.
Figure 13B:
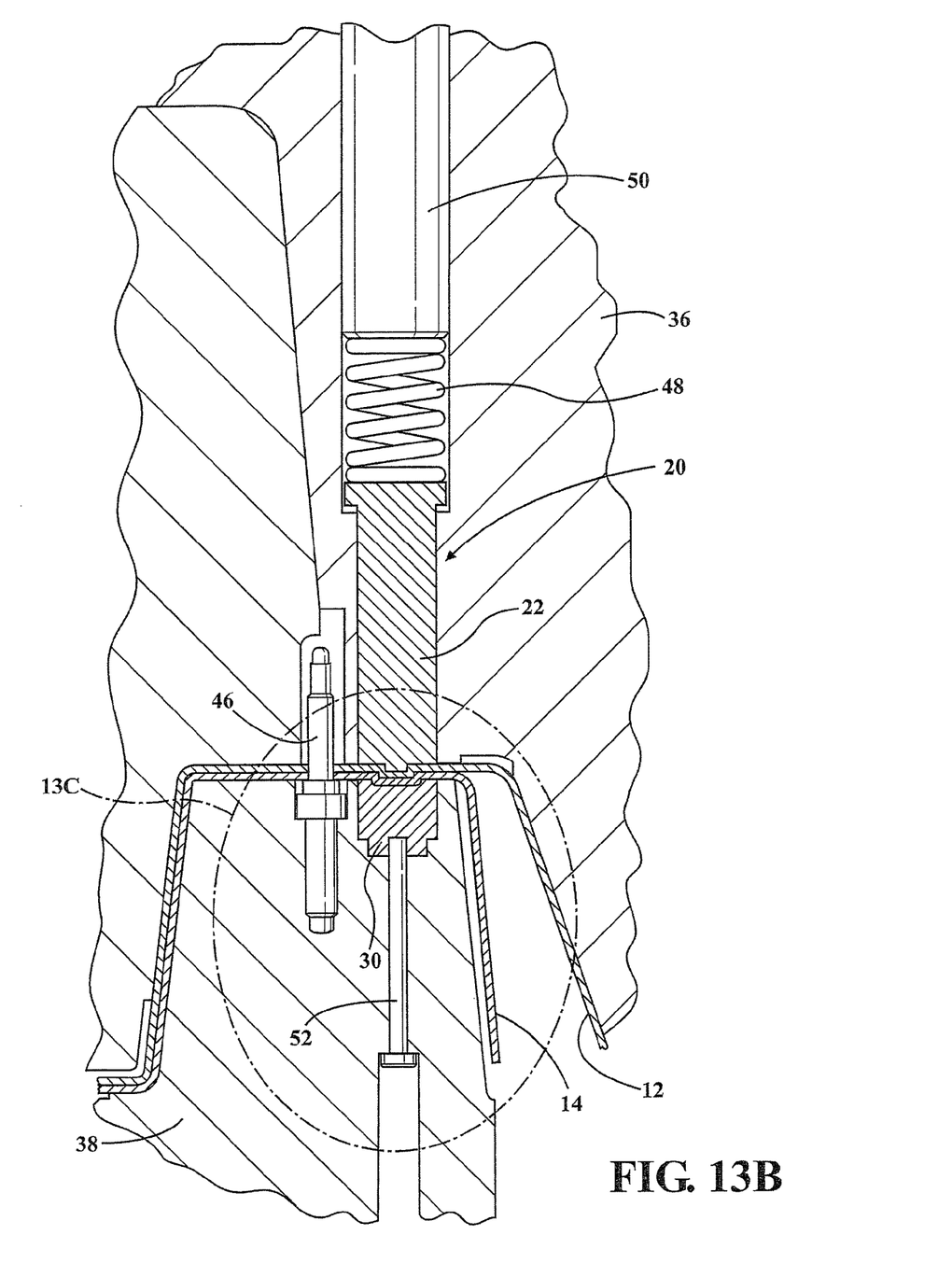
FIG. 13B is an enlarged view of the circled portion shown in FIG. 13A.
Figure 13C:
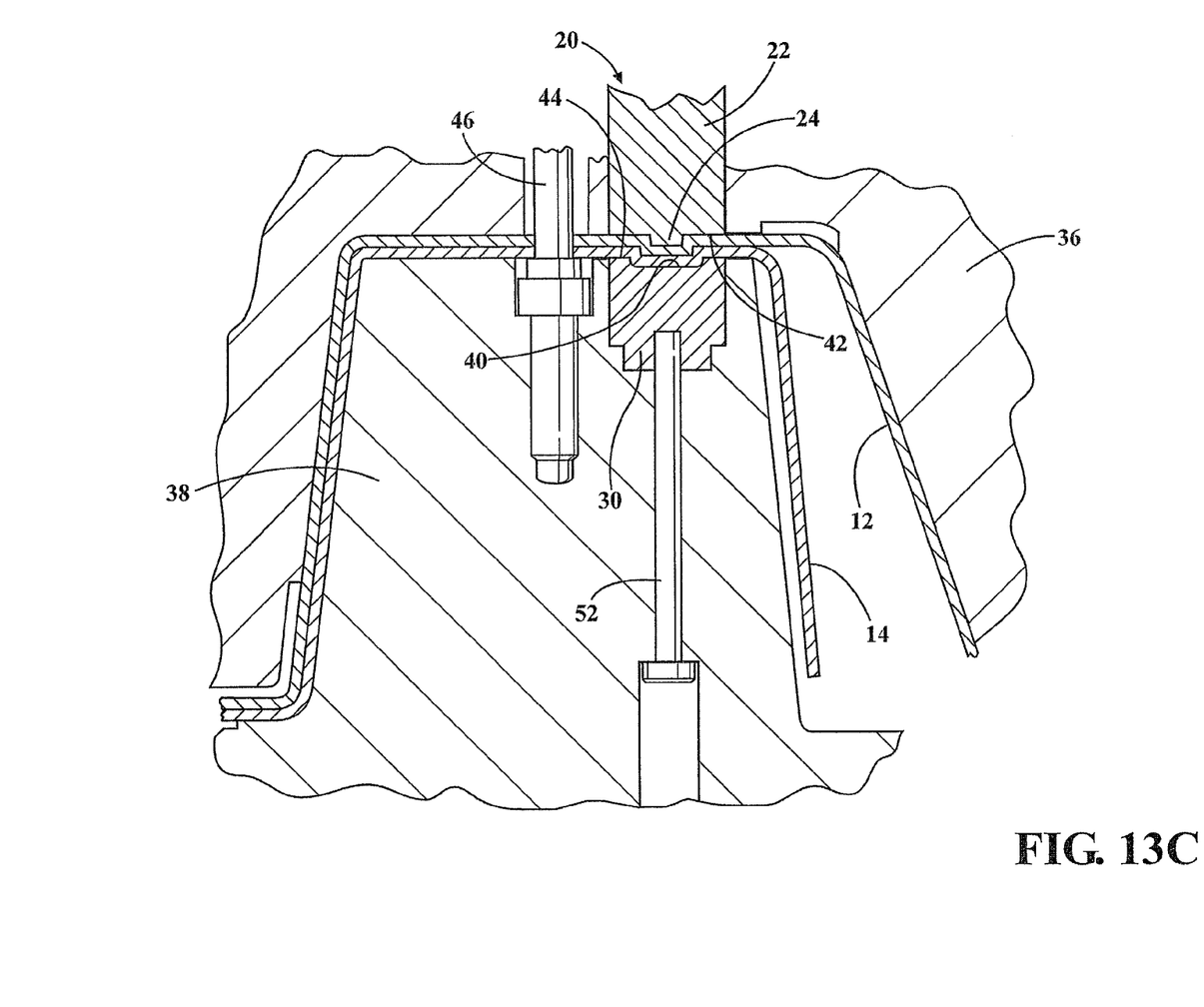
FIG. 13C is an enlarged view of the circled portion shown in FIG. 13B.

There are two different embodiments of the punch portion 20 shown in the Figures, one embodiment is shown in FIGS. 3 and 8, and another embodiment of the punch portion 20 is shown in FIGS. 13A-13C. While two embodiments of the punch portion 20 are shown in the Figures, it is within the scope of the invention that the punch portion 20 (and the die portion 30, if desired) may be of different shapes to form different types of clinches 18. It is also intended that the clinches 18 may be any type of metal deformation or displacement used to form a connection between two parts, such as the sheets 12,14.

The embodiment of the punch portion 20 shown in FIGS. 3 and 8 has a longer small diameter portion 24 compared to the small diameter portion 24 shown in FIGS. 13A-13C. With specific reference to FIGS. 13A-13C, the small diameter portion 24 of the punch portion 20 is adjacent a first support surface 42, and the first support surface 42 is in contact with the front sheet 12 and surrounds the material 26 of the front sheet 12 displaced by the small diameter portion 24. There is a second support surface 44 formed as part of the die portion 20 which is adjacent the recess 40. When the carrier 10 is placed in the mold 34, the second support surface 44 contacts the rear sheet 14 and surrounds the material 28 of the rear sheet 14 displaced by the small diameter portion 24. The function of each of the support surfaces 42,44 is to support the respective sheets 12,14 as the clinch 18 is formed. Portions of each of the sheets 12,14 are located between the support surfaces 42,44, and are prevented from moving as the area of material 26 of the front sheet 12 and the area of material 28 of the rear sheet 14 are displaced by the small diameter portion 24 of the punch portion 20, best seen in FIG. 13C.

Referring to FIGS. 3 and 8, if desired, the small diameter portion 24 of the punch portion 20 may be longer if desired, and the use of the first support surface 42 may be eliminated. The increased length of the small diameter portion 24 of the punch portion 20 may be used to create a different type of clinch 18, depending upon the application. A tapered surface 54 may optionally be formed as part of the small diameter portion as shown in FIGS. 3 and 8, which also creates a different type of clinch 18.

It can be seen in FIGS. 9A-13C that plastic material which makes up the composite panel 16 is injected and able to flow into the mold 34 and be unaffected by the location or placement of the clinches 18. The present invention therefore provides the unique advantage of reducing the number of steps in the manufacturing process involving creating a part by clinching in a separate machine, and then placing the clinched part into an injection molding machine to form the completed part. The present invention eliminates clinching as a separate step from injection molding. The sheets 12,14 are assembled using the clinches 18, and the molten material is injected into the mold, finishing the carrier 10. This combines the processes of clinching two pieces of material together in a mold and injection molding a molten material into the mold as a single process, improving manufacturing efficiency.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A process for creating a component made of both plastic and metal, comprising the steps of:
   providing a first metal component;
   providing a second metal component;
   inserting said first metal component into a mold;
   inserting said second metal component into said mold;
   providing a pin mounted within said mold;
   providing a spring located against an end of said pin;
   providing a punch portion located in said mold, an end of said punch portion located against said spring;
   providing at least one connection point for connecting said first metal component to said second metal component; and
   injecting a molten material into said mold around said first metal component and said second metal component, said punch portion receiving pressure from said spring and pin arrangement and remaining in contact with one of said first metal component and said second metal component as said molten material is injected.

2. The process for creating a component made of both plastic and metal of claim 1, further comprising the steps of:
   providing a large diameter portion formed as part of said punch portion;
   providing a small diameter portion formed as part of said punch portion;
   positioning said small diameter portion in contact with one of said first metal component or said second metal component; and
   applying a force to said large diameter portion formed as part of said punch portion such that an area of one of said first metal component and said second metal component is punched into an area of the other of said first metal component or said second metal component to form said at least one connection point.

3. The process for creating a component made of both plastic and metal of claim 2, further comprising the steps of:
   positioning said small diameter portion of said punch portion in contact with said first metal component;
   displacing a first area of material of said first metal component with said small diameter portion of said punch portion;
   displacing a second area of material of said second metal component as said small diameter portion of said punch portion displaces said first area of material; and
   interlocking said first area of material with said second area of material, forming said at least connection point.

4. The process for creating a component made of both plastic and metal of claim 3, further comprising the steps of:
   providing a die portion disposed in said mold;
   providing a recess formed as part of said die portion; and
   displacing said first area of material of said first metal component and said second area of material of said second metal component into said recess formed as part of said die portion.

5. The process for creating a component made of both plastic and metal of claim 4, further comprising the steps of:
   providing a first contact surface formed as part of said punch portion adjacent said small diameter portion of said punch portion; and
   providing a second contact surface formed as part of said die portion adjacent said recess such that when said first sheet and said second sheet are disposed in said mold, said first sheet and said second sheet are located between said first contact surface and said second contact surface.

6. The process for creating a component made of both plastic and metal of claim 1, further comprising the steps of providing said component to be a carrier for a vehicle.

7. The process for creating a component made of both plastic and metal of claim 1, further comprising the steps of providing said at least one connection point to be at least one clinch.

8. The process for creating a component made of both plastic and metal of claim 7, further comprising the steps of providing said at least one clinch to be a plurality of clinches.

9. The process for creating a component made of both plastic and metal of claim 1, further comprising the steps of:
   providing a first half of said mold;
   providing a second half of said mold;
   connecting said first half of said mold to said second half of said mold after said first metal component is inserted into said mold and said second metal component is inserted into said mold; and forming said at least one connection point as said first half of said mold is connected to said second half of said mold.

10. The process for creating a component made of both plastic and metal of claim 9, further comprising the steps of:
providing said first half of said mold to be a cavity half;
providing said second half of said mold to be a core half;
inserting said first metal component into said core half;
inserting said second metal component into said core half;
connecting said cavity half to said core half; and
injecting said molten material into said cavity half and said core half around said first metal component and said second metal component.

11. The process for creating a component made of both plastic and metal of claim 1, further comprising the steps of providing said first metal component to be a front sheet.

12. The process for creating a component made of both plastic and metal of claim 11, further comprising the steps of providing said second metal component to be a rear sheet.

13. A process for creating a component for a vehicle made of both plastic and metal, comprising the steps of:
providing a first sheet;
providing a second sheet;
providing a pin mounted within said mold;
providing a spring located against an end of said pin;
placing said first sheet in a cavity of a mold;
placing said second sheet in said cavity of said mold in proximity to said first sheet such that a first area of said first sheet is in contact with a second area of said second sheet when said first sheet and said second sheet are placed in said cavity of said mold;
providing a punch portion located in said mold, an end of said punch portion located against said spring such that said spring is located between said pin and said punch portion;
applying a pressure to said first area of said first sheet with said punch portion;
forming at least one clinch by displacing said first area of said first sheet and said second area of said second sheet, connecting said first sheet to said second sheet; and
injecting a molten material into said cavity such that at least a portion of said molten material is integrally connected to one of said first sheet or said second sheet, said punch portion receiving pressure from said spring and pin arrangement, and remaining in contact with said first area that has been displaced as said molten material is injected.

14. The process for creating a carrier for a vehicle made of both plastic and metal of claim 13, further comprising the steps of:
providing a large diameter portion formed as part of said punch portion;
providing a small diameter portion formed as part of said punch portion;
positioning said small diameter portion of said punch portion to be in contact with said first area of said first sheet;
applying pressure to said large diameter area of said punch portion such that pressure is transferred to said small diameter portion; and
displacing said first area of said first sheet as said small diameter portion of said punch portion receives pressure from said large diameter portion of said punch portion, such that said first area of said first sheet and second area of said second sheet are displaced, forming said at least one clinch.

15. The process for creating a component made of both plastic and metal of claim 14, further comprising the steps of:
providing a die portion disposed in said mold;
providing a recess formed as part of said die portion; and
displacing said first area of said first sheet and said second area of said second sheet into said recess as said small diameter portion of said punch portion receives pressure from said large diameter portion, forming said at least one clinch.

16. The process for creating a component made of both plastic and metal of claim 15, further comprising the steps of:
providing a first half of said mold;
providing a second half of said mold;
mounting said punch portion in said first half of said mold;
mounting said die portion in said second half of said mold;
connecting said first half of said mold to said second half of said mold after said first metal component is inserted into said mold and said second metal component is inserted into said mold; and
displacing said first area of said first sheet and said second area of said second sheet into said recess as said first half of said mold is connected to said second half of said mold, forming said at least one connection point.

17. The process for creating a component made of both plastic and metal of claim 16, further comprising the steps of:
providing said first half of said mold to be a cavity half;
providing said second half of said mold to be a core half;
inserting said first metal component into said core half;
inserting said second metal component into said core half;
connecting said cavity half to said core half; and
injecting said molten material into said cavity half and said core half around said first metal component and said second metal component.

18. The process for creating a component made of both plastic and metal of claim 15, further comprising the steps of:
providing a first contact surface formed as part of said punch portion in proximity to said small diameter portion; and
providing a second contact surface formed as part of said die portion in proximity to said recess such that when said first sheet and said second sheet are disposed in said mold, said first sheet and said second sheet are located between said first contact surface and said second contact surface.

19. The process for creating a component made of both plastic and metal of claim 13, further comprising the steps of interlocking said first area of said first sheet with said second area of said second sheet, forming said at least one clinch.

20. The process for creating a component made of both plastic and metal of claim 13, further comprising the steps of providing said at least one clinch to be a plurality of clinches.

21. The process for creating a carrier for a vehicle made of both plastic and metal of claim 13, further comprising the step of providing said component for said vehicle to be a carrier.

22. A process for creating a carrier for a vehicle made of both plastic and metal, comprising the steps of:
providing a front sheet made of metal, said front sheet forming a part of said carrier;
providing a rear sheet made of metal, said rear sheet forming a part of said carrier;
providing a mold having a cavity half;
providing said mold to have a core half;
providing a pin mounted within said mold;
providing a spring located against an end of said pin;
inserting said front sheet into said core half of said mold;

inserting said rear sheet into said core half of said mold in proximity to said front sheet such that a first area of said front sheet contacts a second area of said rear sheet;

providing a punch portion mounted in said cavity half of said mold, an end of said punch portion located against said spring;

providing a die portion mounted in said core half of said mold;

connecting said cavity half to said core half such that said punch portion applies a force to said first area and said second area to displace said first area and said second area into said die, forming at least one clinch with said first area and said second area, thereby connecting said front sheet to said rear sheet; and injecting a molten material into said mold around said front sheet and said rear sheet, completing the formation of said carrier, said punch portion receiving pressure from said spring and pin arrangement, and remaining in contact with said first area that has been displaced as said molten material is injected.

23. The process for creating a carrier for a vehicle made of both plastic and metal of claim 22, further comprising the steps of:

providing a large diameter portion formed as part of said punch portion;

providing a small diameter portion formed as part of said punch portion;

positioning said small diameter portion of said punch portion to be in contact with said first area of said front sheet;

applying a pressure to said large diameter portion of said punch portion to apply pressure to said first area of said front sheet with said small diameter portion; and displacing said first area of said front sheet with said small diameter portion of said punch portion such that said first area of said first sheet and said second area of said second sheet are displaced into said die, interlocking said first area of said front sheet with said second area of said second sheet.

24. The process for creating a carrier for a vehicle made of both plastic and metal of claim 22, further comprising the steps of:

providing a recess formed as part of said die portion; and displacing said first area and said second area into said recess with said small diameter of said punch portion as said cavity half of said mold is connected to said core half.

25. The process for creating a carrier for a vehicle made of both plastic and metal of claim 14, further comprising the steps of:

providing a first contact surface formed as part of said punch portion, said first contact area surrounding said small diameter of said punch portion;

providing a second contact area formed as part of said die portion, said second contact area surrounding said recess; and contacting said front sheet with said first contact surface and contacting said rear sheet with said second contact surface as said cavity half of said mold is connected to said core half such that when said front sheet and said rear sheet are disposed in said mold, said front sheet and said rear sheet are located between said first contact surface and said second contact surface.

26. The process for creating a carrier for a vehicle made of both plastic and metal of claim 22, further comprising the steps of providing said at least one clinch to be a plurality of clinches.

* * * * *